(12) United States Patent
Hall, Jr. et al.

(10) Patent No.: US 9,225,267 B2
(45) Date of Patent: Dec. 29, 2015

(54) TRANSDUCING APPARATUS

(71) Applicants: Edwin L. Hall, Jr., Amelia Island, FL (US); Hampton Hollis Tanner, Amelia Island, FL (US)

(72) Inventors: Edwin L. Hall, Jr., Amelia Island, FL (US); Hampton Hollis Tanner, Amelia Island, FL (US)

(73) Assignee: WELL TRAVELED IMPORTS, INC., Amelia Island, VA (US)

( * ) Notice: Subject to any disclaimer, the term of this patent is extended or adjusted under 35 U.S.C. 154(b) by 344 days.

(21) Appl. No.: 13/912,146

(22) Filed: Jun. 6, 2013

(65) Prior Publication Data

US 2014/0361660 A1    Dec. 11, 2014

(51) Int. Cl.
*H01H 35/02* (2006.01)
*H02N 11/00* (2006.01)
*F24H 9/20* (2006.01)

(52) U.S. Cl.
CPC ........... *H02N 11/002* (2013.01); *F24H 9/2071* (2013.01)

(58) Field of Classification Search
CPC ....................................... H01H 35/02
USPC ................... 200/61.52, 61.45 R, 277–277.1, 200/329–332.1
See application file for complete search history.

(56) References Cited

U.S. PATENT DOCUMENTS

| | | | | |
|---|---|---|---|---|
| 4,001,185 | A * | 1/1977 | Mitsui et al. | 200/61.45 R |
| 4,755,653 | A * | 7/1988 | Townsend et al. | 392/365 |
| 6,072,129 | A * | 6/2000 | Ishikawa et al. | 200/61.45 R |
| 6,139,053 | A * | 10/2000 | Knox | 280/735 |
| 6,559,396 | B1 * | 5/2003 | Chou | 200/61.52 |
| 6,917,004 | B1 * | 7/2005 | Engdahl | 200/61.45 R |

OTHER PUBLICATIONS

International Searching Authority PCT Invitation to Pay Additional Fees and, where applicable, protest fee, Aug. 1, 2014, by Authorized Officer Matias Garraz, Gruno.

* cited by examiner

*Primary Examiner* — Edwin A. Leon
*Assistant Examiner* — Iman Malakooti
(74) *Attorney, Agent, or Firm* — Lau & Associates

(57) ABSTRACT

A transducing apparatus that is sensitive to physical vibrations. The transducing apparatus converts physical manifestations into electrical signals.

26 Claims, 10 Drawing Sheets

TRANSDUCING APPARATUS

FIELD OF INVENTION

This invention generally relates to a transducer device to convert physical manifestations into electrical signals.

BACKGROUND OF THE INVENTION

A transducer that converts physical manifestations into electrical signals can have infinite number of real life applications. They can be used for example to detect the level of highway and bridge deterioration by detecting differences in frequency of vibrations from year to year. They can be used to gage the level of danger of a potential landslide. They can be used to detect earthquakes and intensity of earthquakes. They can also be used as a power cutoff device if anticipated events occurred in industrial or commercial applications.

OBJECT OF THE INVENTION

It is a first object to electro-mechanically detect physical vibrations.

It is a second object to use the present invention to count the number of power interruptions.

It is a third object to use the present invention as a switch to interrupt signal output.

It is a fourth object to use the present invention as a switch to initiate electrical output.

It is a fifth object to use the present invention to serve as a level switch.

It is a sixth object to use the present invention as an automatic control device.

It is a seventh object of the present invention to promote safety by utilizing a level safety switch mechanism.

It is an eighth object of the present invention to report an occurrence of an anticipated event.

Other objects of the present invention would become self evident upon a review of the following written specification, drawings and claims.

DETAILED DESCRIPTION OF THE INVENTION

Figure 1:
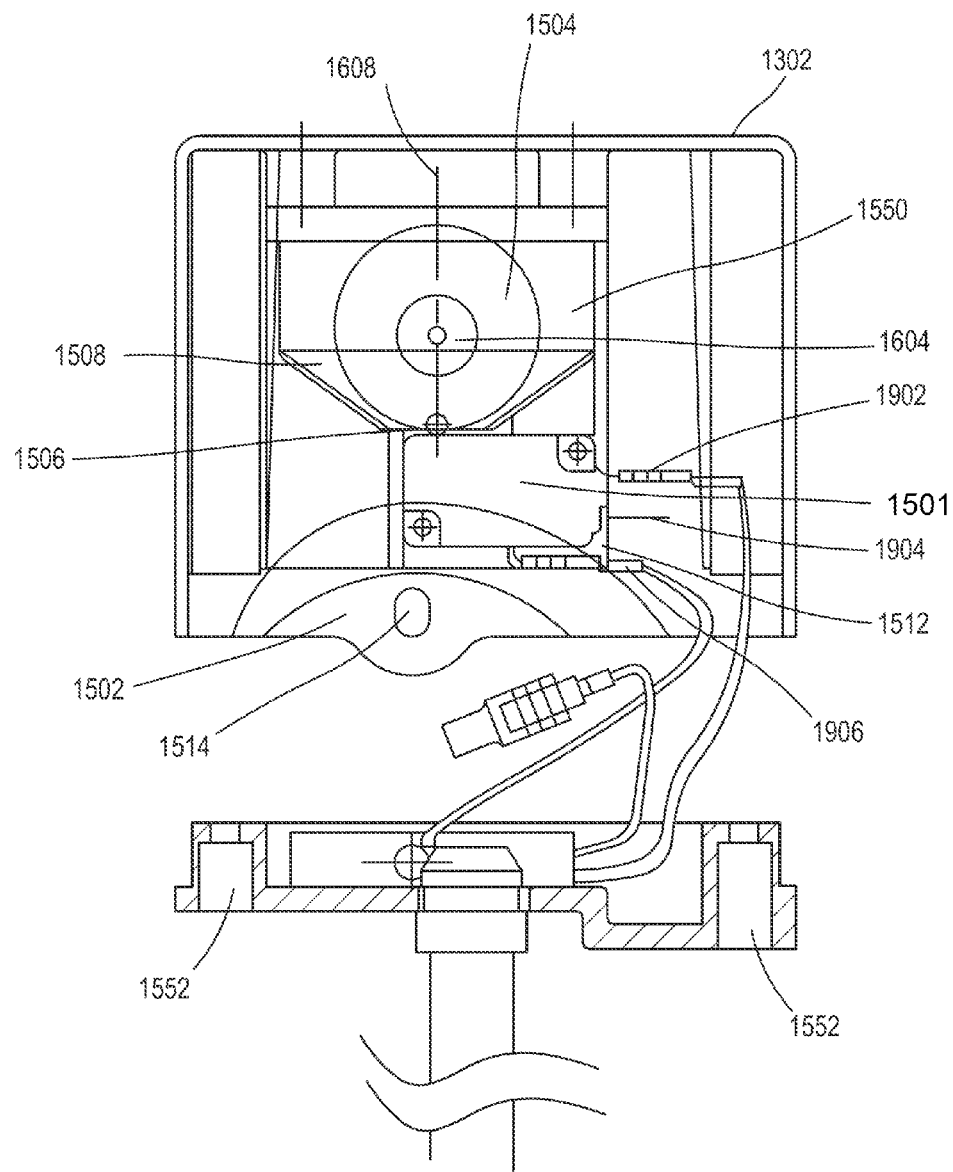
FIG. 1 illustrates a cross sectional view along a longitudinal direction of the present invention.
Figure 2:
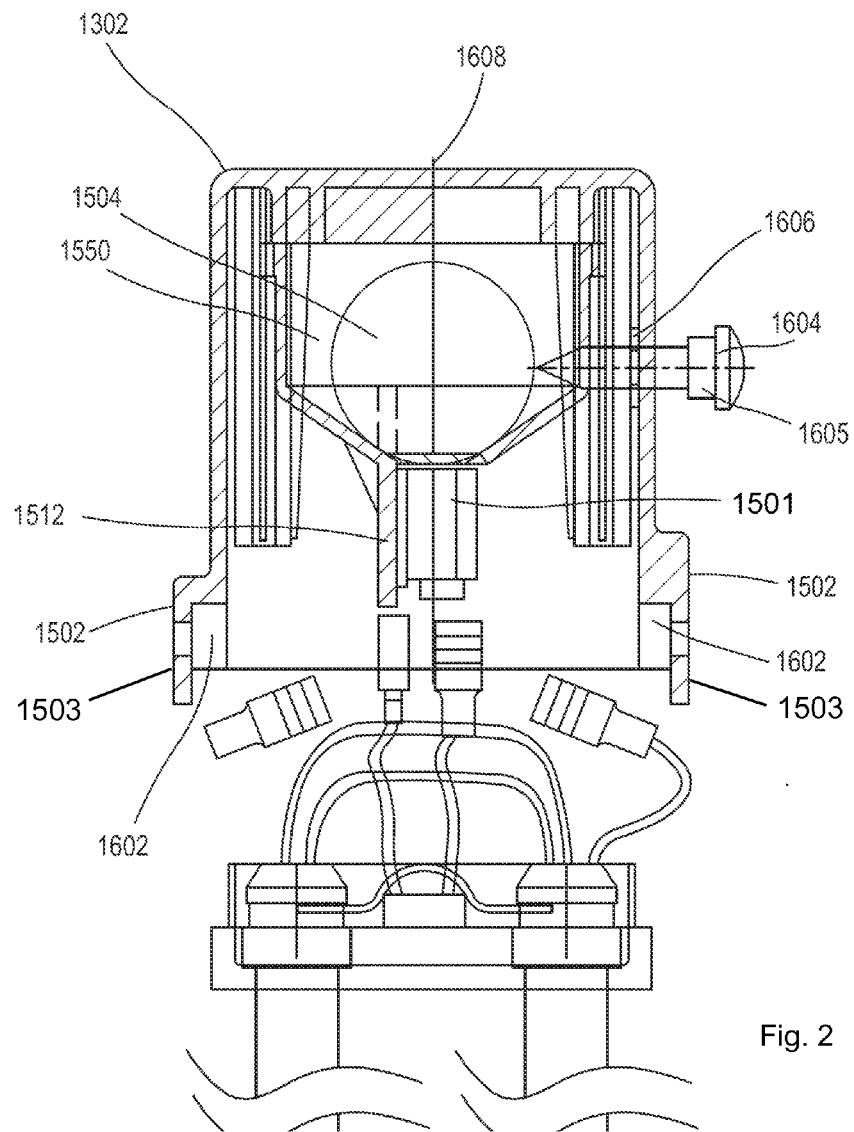
FIG. 2 illustrates a cross sectional view along a depth direction of the present invention of FIG. 1.

The transducer of the present invention is shown in a cross-sectional view along a longitudinal direction in FIG. 1 and a cross-sectional view of which along a depth direction is shown in FIG. 2. A box 1302 is mounted on a mounting bracket 714 along a curved engagement segment 1502 on both sides. The curved engagement segment 1502 has interior accommodation zones 1602 to house complimentary curved engagement segments of the mounting bracket. The curved engagement segments 1502 include a pair of outer engaging portions 1503. Degrees of curvature on the curved engagement segment 1502 and the curved engagement segments of the mounting bracket are complementary. Once it is determined that the box 1302 is leveled thus substantially parallel to the floor, a fastener is tightened to the mounting bracket 714 via hole 1514. Though the example usage given herein below is for a heater, the present invention could be used in many other applications. The mounting bracket could be in a U-shape where the complimentary curved engagement segments reside by both distal ends of the U-shaped bracket. The mid-section of the U-Shaped mounting bracket can be mounted to the floor/ground depending upon the application. The present invention could be mounted on top of the mounting bracket.

There could be applications where the U-shaped mounting bracket could not be mount on a top-down position but must be mounted on a sideway position. Then another side-mount bracket for example an L-shaped bracket whereby the vertical segment of the L-Shaped bracket is mounted to a vertical wall and whereby the horizontal segment of the L-shaped bracket is for accommodating a U-shaped bracket to be mounted thereon.

In one example, the purpose of the box 1302 is to cut-off electrical supply in case a level condition no longer exists. In heater applications, cutting-off power supply of a toppled heater unit would effectively prevent any accidental fires from starting. Within the box is a ball bearing 1504. As the heater unit is standing upright, the weight of the ball bearing 1504 sits on top of a switch trigger 1506 making an electrical connection. The ball bearing 1504 is channeled by the interior chamber 1507 with the help of gravity pull to engage the switch trigger 1506. Upon sufficient tilting away from being level, the ball bearing 1506 affected by gravity would roll away from the center thus disengage the switch trigger 1506.

The angle that causes the engagement and disengagement of switch trigger 1506 can be of critical importance. It cannot be so sensitive as to cause power disruption upon any minute detection of shaking such as due to blowing winds, accidental bumping into the heater during routine use, uneven floorboards any movements of which transmits vibration to the heater, etc. It also cannot be so insensitive that even in situations of a real danger, the level switching mechanism does not disrupt electrical power transmitted to the heater. It is determined that a good angle to cutoff power supply could be substantially in a range between 30-40 degrees from a perfectly level horizontal position, as could be easily established by a bubble leveler. Anywhere between this range of angles should be safe. However, 34 degree is determined to be the ideal angle to ensure cutoff when needed and maintain power on when inconsequential random movements occurred.

However, the level of sensitivity to trigger an event could be application specific and could be tailor to specific needs. One way to change sensitivity is changing the weight of ball bearing 1504. The heavier is the ball bearing, the less sensitive is the present invention. The lighter is the ball bearing, the more sensitive is the present invention. Of course, the minimum weight is the weight necessary to activate trigger switch 1506.

Another way to affect sensitivity of the present invention is to change the slope of interior chamber 1508. The shallower is the slope, the more sensitive is the present invention. The steeper is the slope of the interior chamber 1508, the less sensitive is the present invention.

The third way to change sensitivity of the present invention is changing the amount of pressure needed to engage the trigger switch 1506. Some trigger switches are fixed to a predetermined trigger pressure. Other trigger switches may have calibration features for the trigger pressure. Regardless which type of trigger switches being used, one should bear in mind a proper amount of trigger pressure could affect the sensitivity of the present invention.

By designating a combination of the slope of the interior chamber, the weight of the ball bearing and the trigger pressure of the trigger switch, one can find the appropriate sensitivity desired for the needed application.

In addition to turning on and off electrical connections as determined by the level switching mechanism, there are situations the present invention could be manually turned off completely such as during periods of non-use. To implement a manual on/off mechanism, a push-in/pull-out mechanical push rod 1604 as shown by way of an example in FIG. 2 is used. Switch trigger 1506 is situated in the box 1302. Upon pushing the push rod 1604 into box 1302, the push rod physically pushes the ball bearing 1504 off-centered thus render it unable to engage switch trigger 1506. Hence, the present invention could never be turned on. Conversely, upon pulling-out of the push rod 1604, the impediment to engage switch trigger 1506 would be removed thus allow ball-bearing 1504 to roll onto the switch trigger 1506, thus engage it to utilize the present invention. Push rod 1604 is prevented from fully retrieved out of the safety box 1302 by the presence of a retaining clip 1606. Similarly, push rod 1604 could never be fully pushed too far by the presence of a stop buffer 1605.

Figure 3:
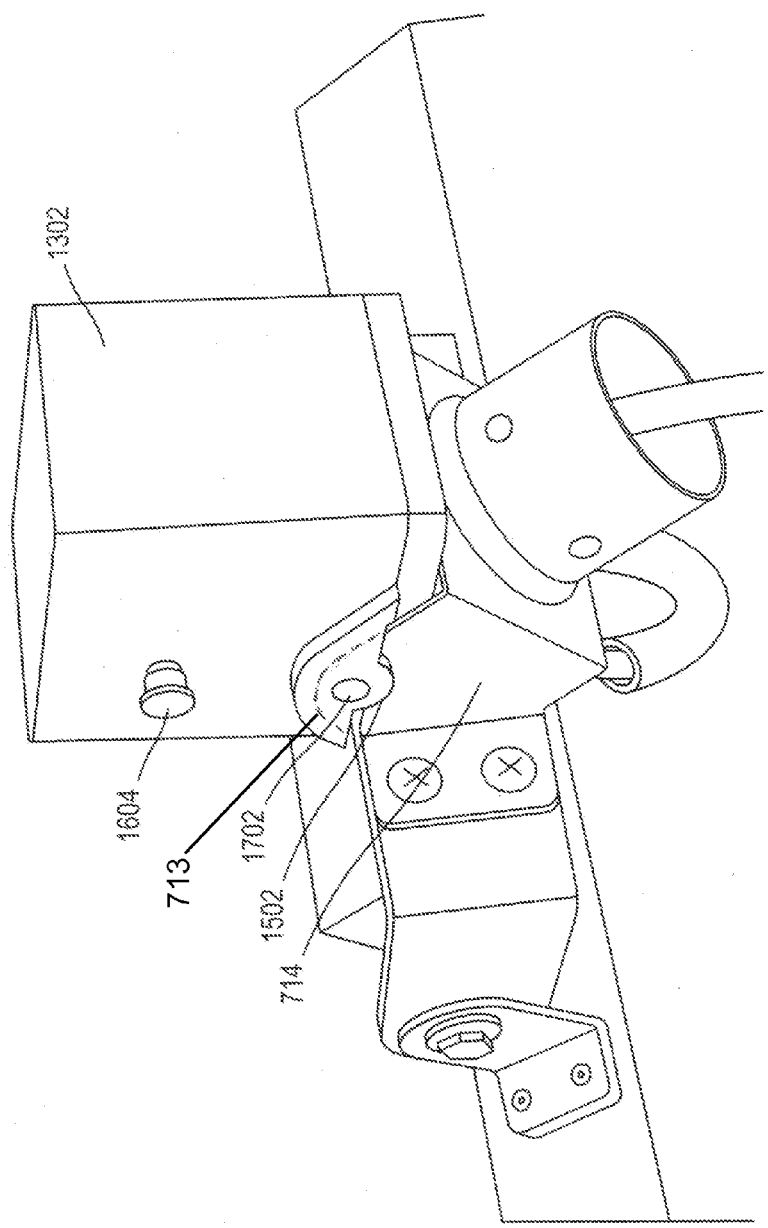
FIG. 3 illustrates how the present invention is mounted onto an industrial, commercial or residential application such as a heater.

FIG. 3 shows a view of the box 1302 fully mounted onto a mount coupler 714. As can be visually verified, once the box 1302 is acceptably level and the interior accommodation zones 1602 sufficiently engage the house complimentary curved engagement segments 713 of the mounting bracket 714, a fastener 1702 is transversely inserted into holes 1514 and tightened into a locked position.

Figure 4:
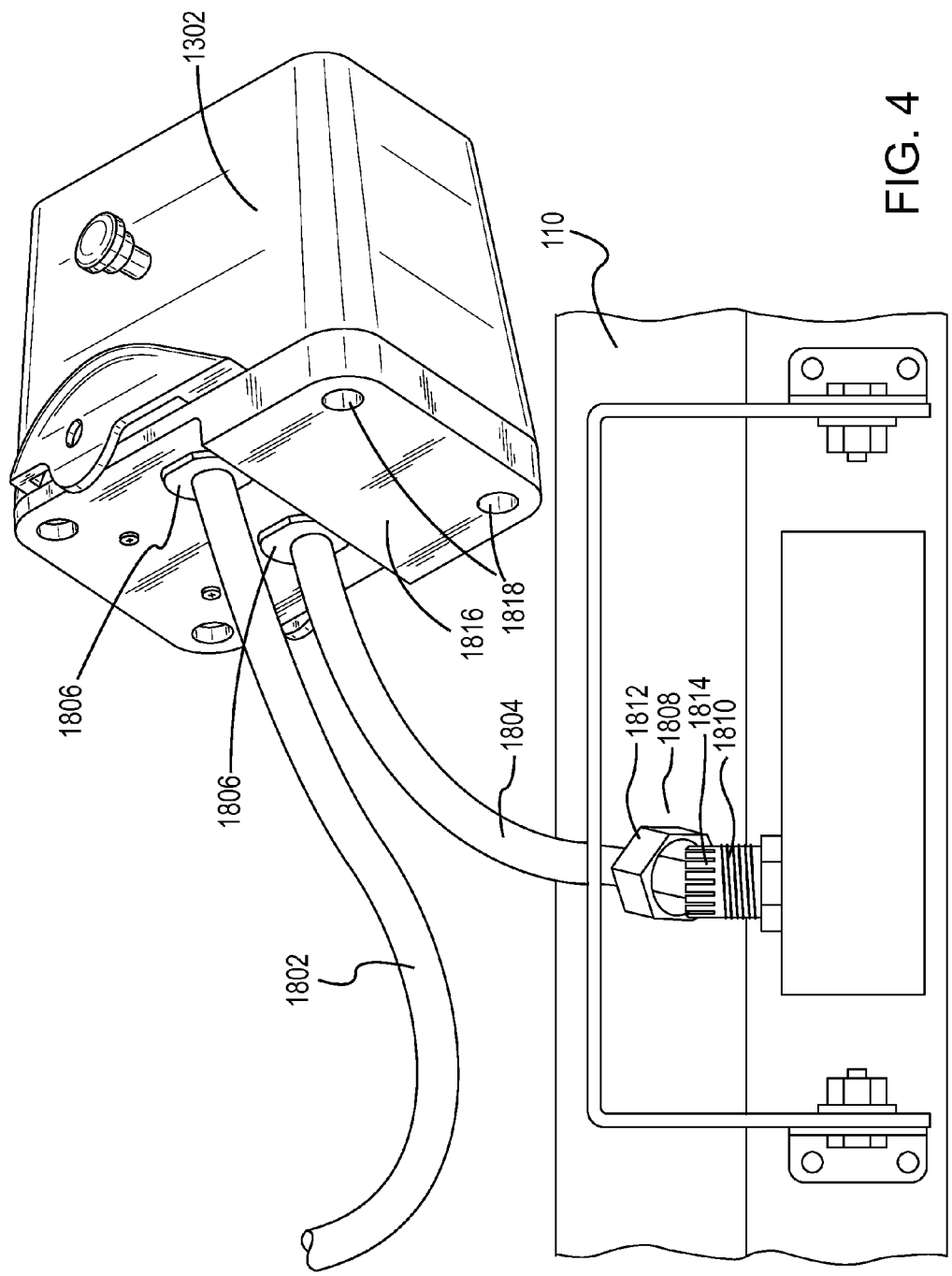
FIG. 4 illustrates how the present invention is electrically connected to the industrial, commercial or residential application such as a heater.

FIG. 4 shows a box 1302 that is dismounted from the mounting bracket. As shown, two electrical wires 1802 and 1804 are connected to the box 1302. Electrical wire 1802 is connected to a plug in power source for example. Electrical wire 1804 is connected to the heater for example. Both electrical wires are secured to the box by through-hole buffers 1806, each buffer is tightly squeezed there-in-between each wire opening and associated wire to close any air gaps to prevent moisture infiltration into the box 1302. With the explanations given above, it should be apparent to a skilled person in the art that power source is transmitted from wire 1802 into safety box 1302, to wires 1804 and finally to an application such as a heater used herein as an example via a moisture proof coupler 1808. Should the box 1302 tilt passed a predetermined angle away from a level horizontal position, switch trigger 1506 is disengaged, thus power to the heater is cut-off.

Coupler 1808 has a mount piece 1810 and a cap piece 1812. One end of mount piece 1810 is thread fitted into part of the heater and another end serves as a receptor for cap piece 1812. By the distal end of said receptor are collapsible columns 1814. As cap piece 1812 is tightened onto mount piece 1810, the collapsible columns 1814 are squeezed in-between wire 1804 and cap piece 1812 to ensure a secured fit and to prevent moisture from entering into the heater.

Figure 5:
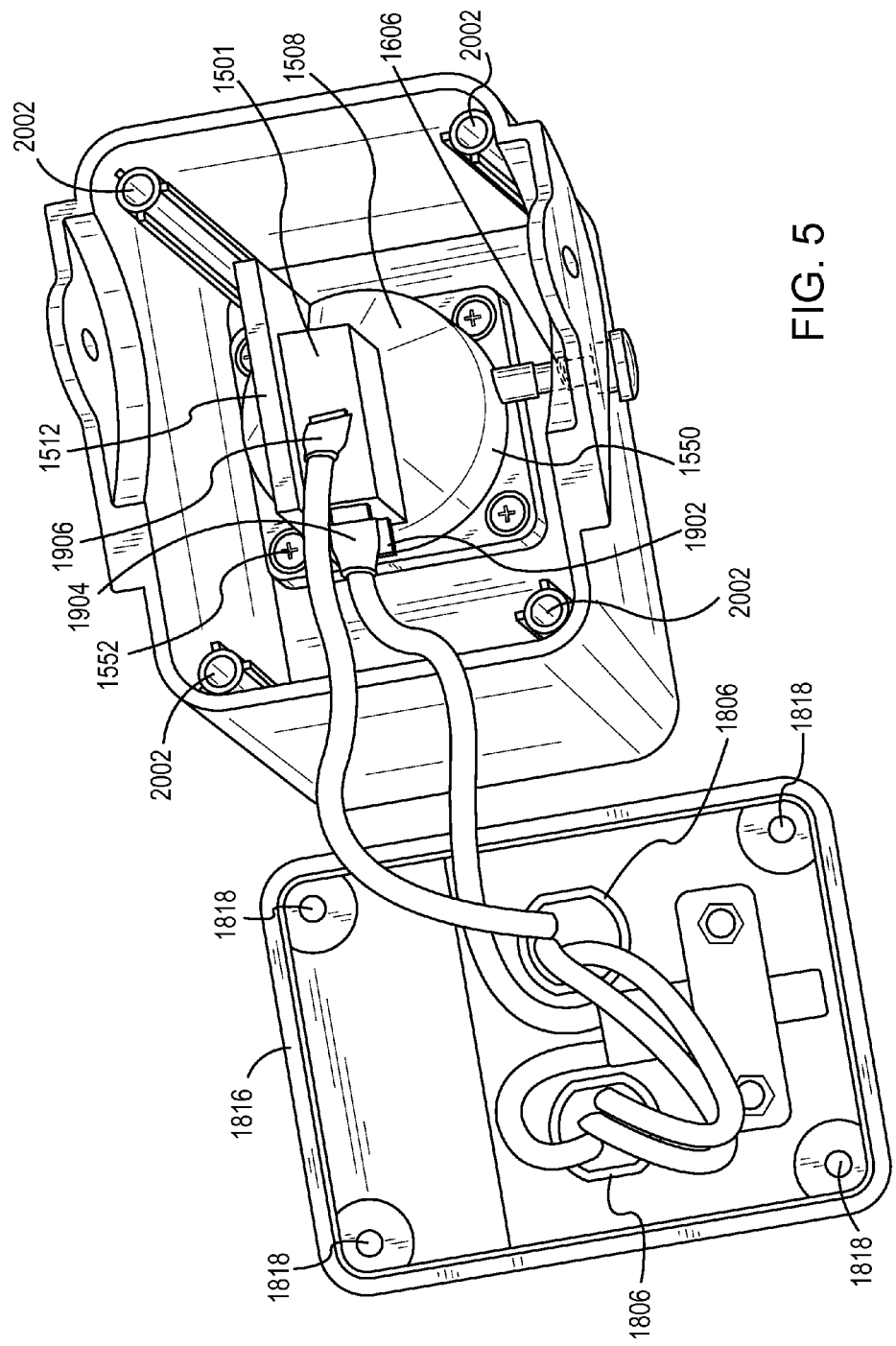
FIG. 5 illustrates a bottom interior view of the present invention of FIG. 1.
Figure 6:
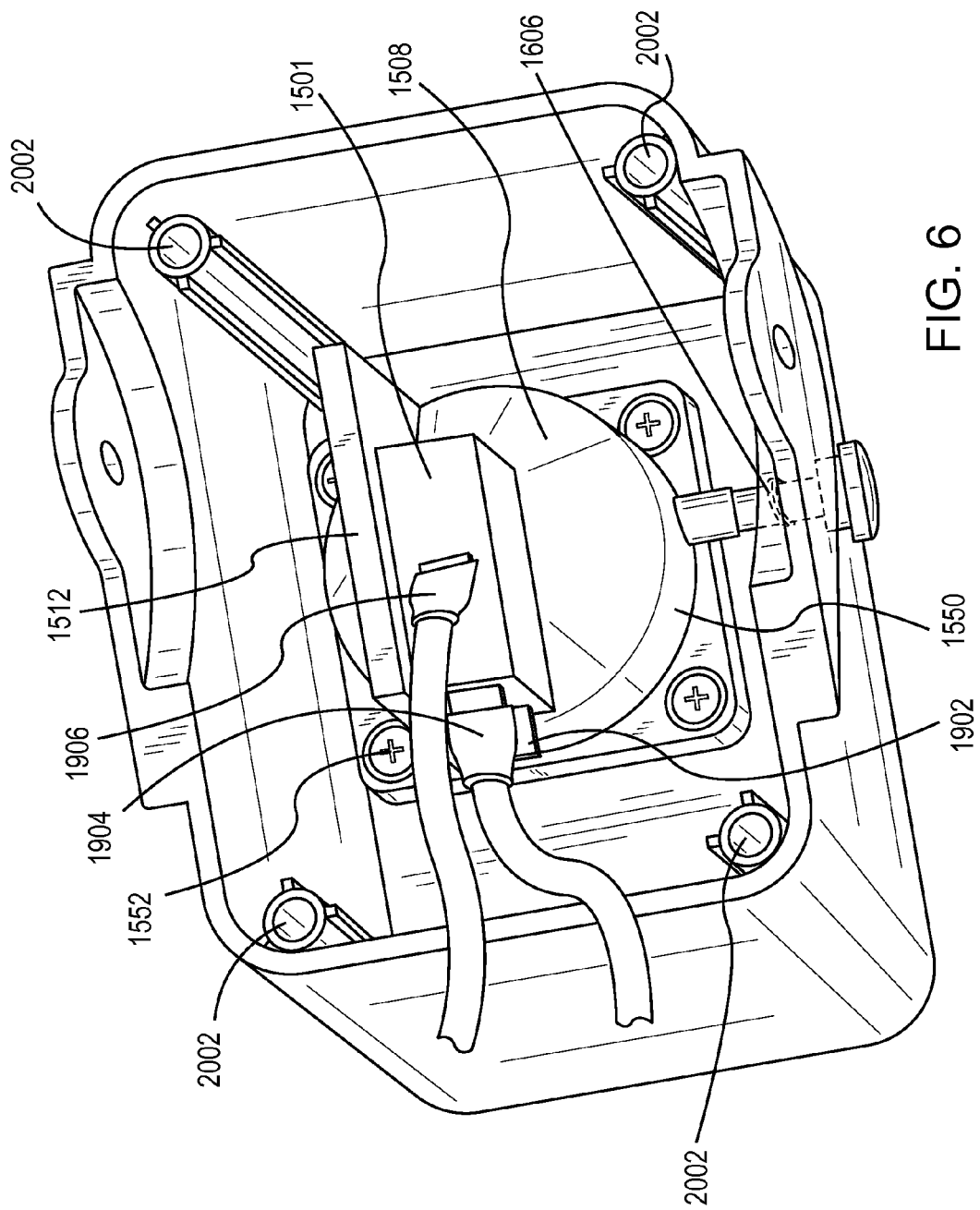
FIG. 6 illustrates another bottom interior view of the present invention of FIG. 1.
Figure 7:
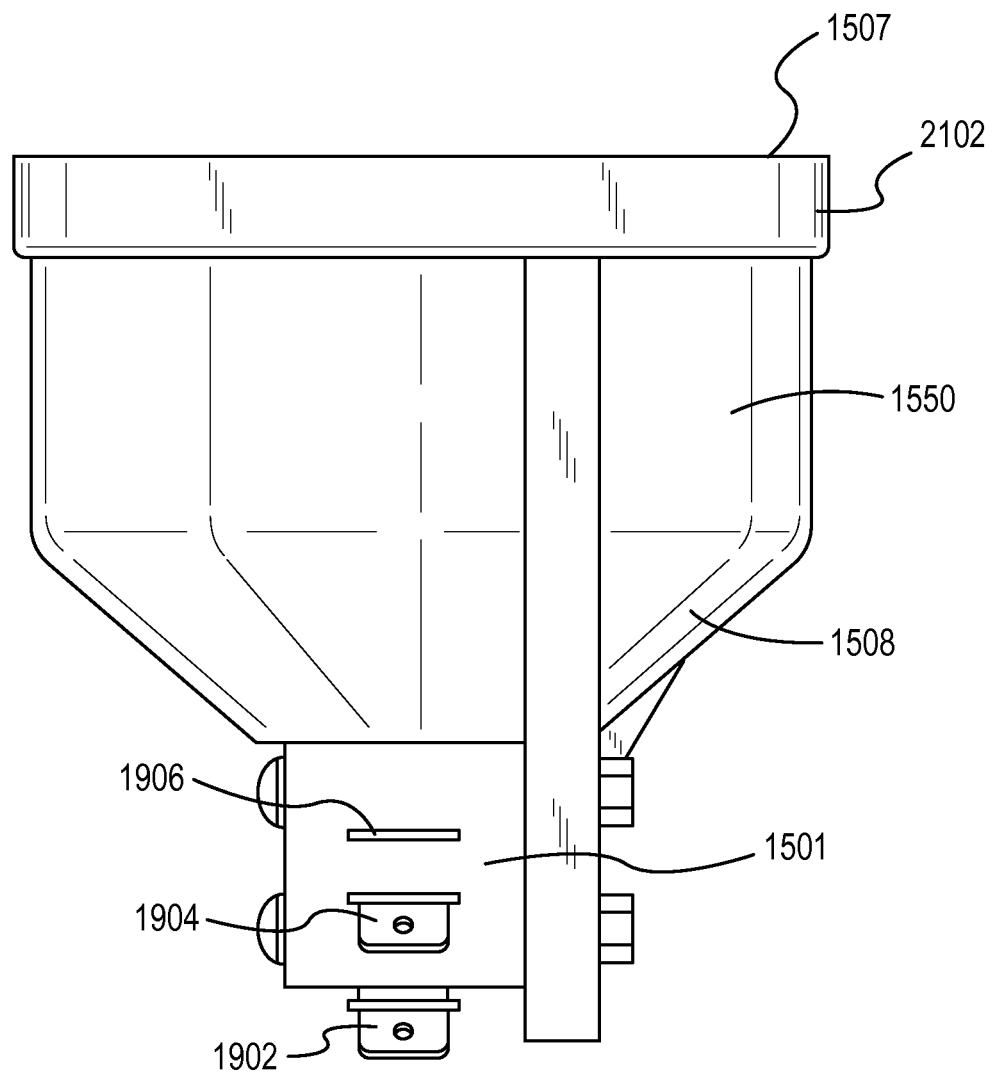
FIG. 7 illustrates a side view of an interior chamber with a vertical wall mounted thereon an electrical switch.

FIGS. 5 and 6 show a bottom interior view of box 1302 and its cover 1816. A switch 1501 is mounted to wall mount 1512.

Figure 8:
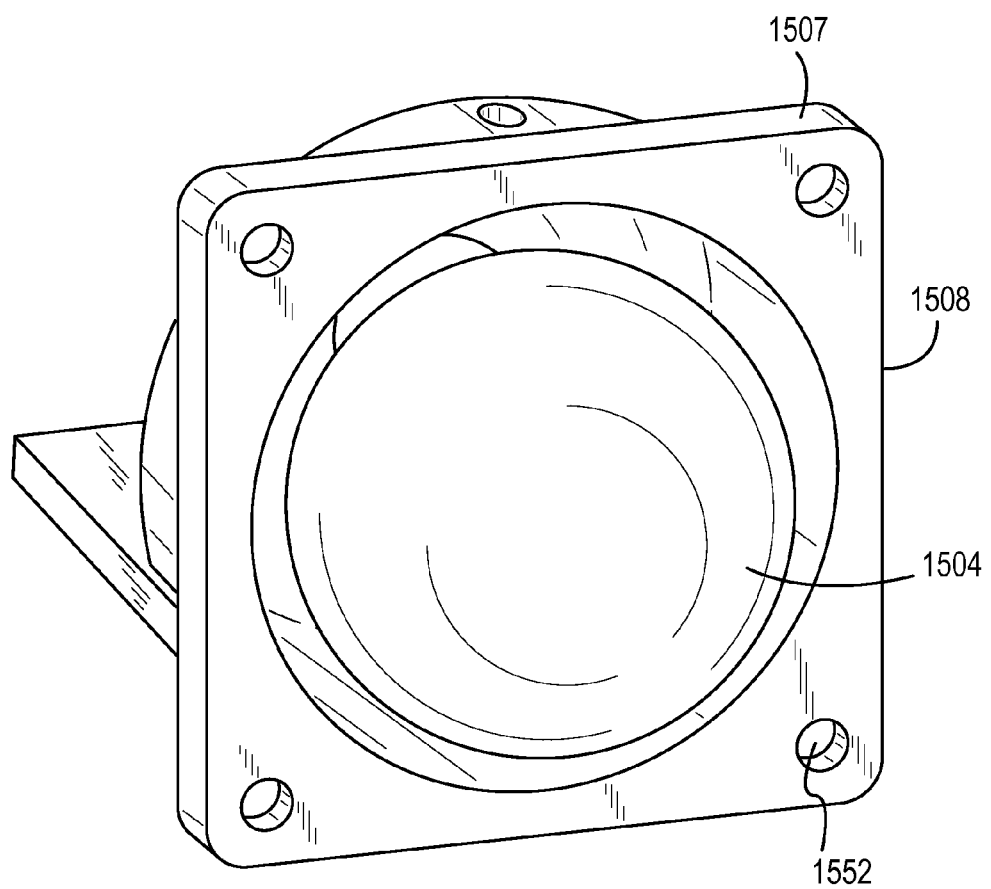
FIG. 8 illustrates a ball bearing inside the interior chamber.
Figure 9:
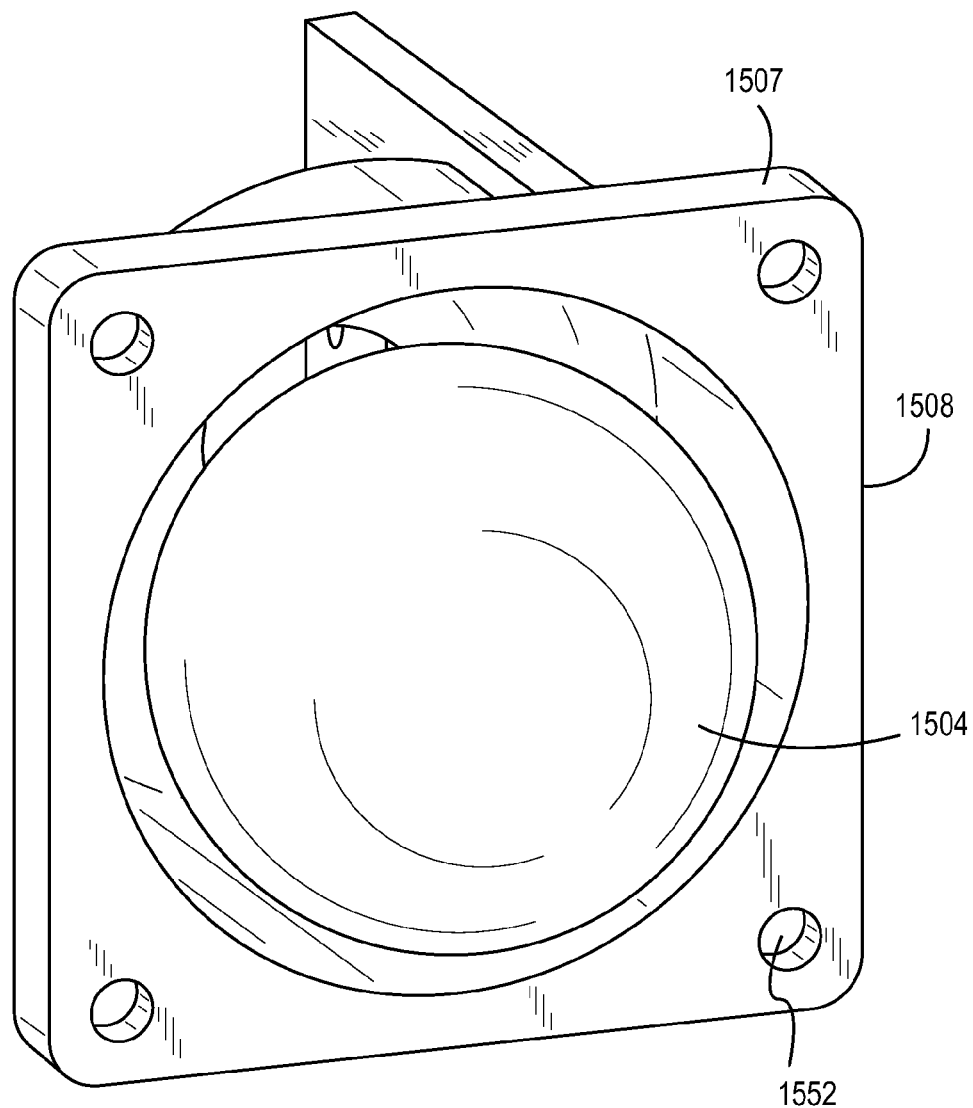
FIG. 9 illustrates a ball bearing inside the interior chamber which is a 90 degrees rotated view of FIG. 8.
Figure 10:
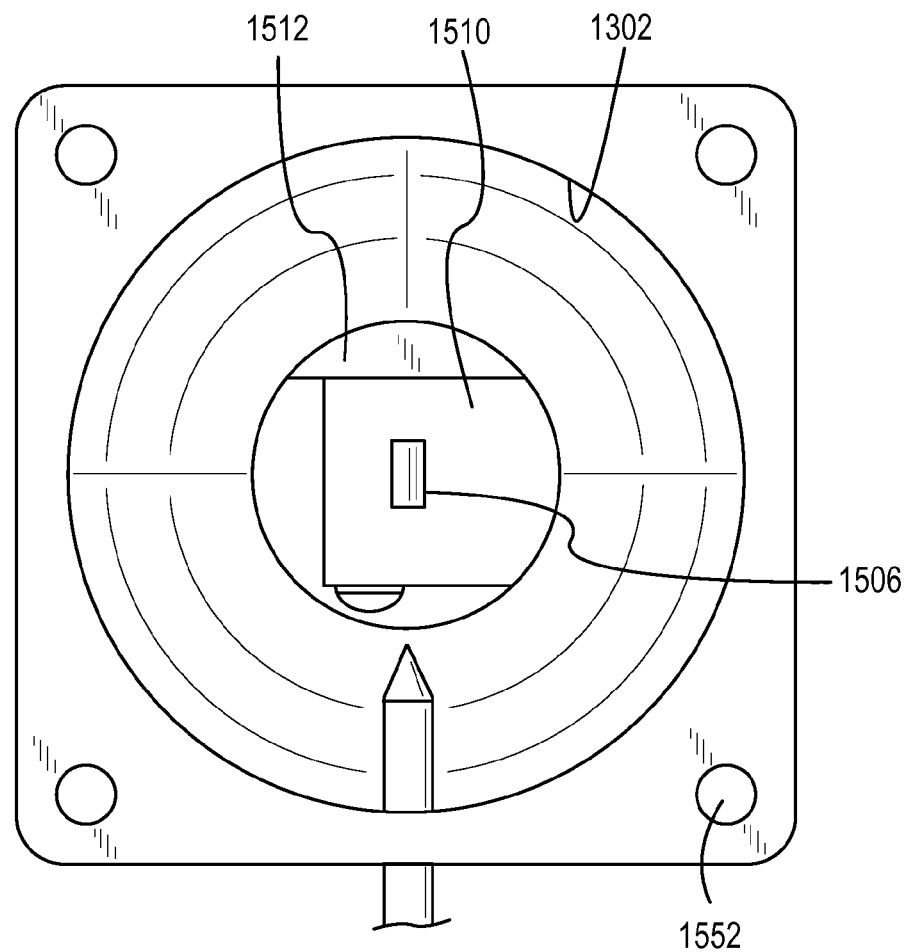
FIG. 10 illustrates a switch pin underneath an opening of the interior chamber.

As better shown in FIGS. 2 and 6, wall mount 1512 indeed is offset from a central axis 1608 of the cone or concave openings. This offset is mainly to ensure the switch trigger 1506 would be located on the bottom along the central axis 1608 of interior chamber 1508, as best shown in FIGS. 1 and 9. This is the perfect location for ball bearing 1504 to engage the switch trigger 1506, as shown in FIGS. 1, 5 and 8.

Switch 1501 has three terminals 1902, 1904 and 1906. Terminal 1906 is connected to wire 1802 leading to a power supply source such as a wall plug, a battery or a renewable energy power source, and terminal 1904 is connected to wire 1814 leading to the heater in this example application. Terminal 1902 is shown not connected to any wire. In effect, terminals 1902 and 1904 are two way switches, meaning that the power source from terminal 1906 is either supplied to terminals 1902 or 1904 at any moment in time. In this invention, when ball bearing 1504 engages switch trigger 1506, power from terminal 1906 is solely supplied to terminal 1904 which in turn is supplied to the heater in our example. When the ball bearing 1504 disengages switch trigger 1506, power from terminal 1906 is solely supplied to terminal 1902 leaving the heater completely without power. Though not shown, terminal 1902 may be used for such optional features as 1) empowering a siren to alert end users that attention is needed, 2) activate a counter to record the number of power interruptions, 3) use as a trigger to cutoff the power source to wire 1802, or 4) activate a transmitter to report the activate event in real time to a remote location. By so cutoff the power source to wire 1802, even if the ball bearing 1504 engages switch trigger 1506 again, there would not be any power source until an operator resets the external power supply source. There are many more scenarios where terminal 1904 could provide optional features.

FIGS. 5 and 6 show a set of screw receiving stems 2002 located at four interior corners of the box. They are present to allow a cover 1816 with a set of through-holes 1818 located about its four interior corners to accommodate four fasteners to secure and seal the box 1302.

FIGS. 1, 2 and 6 show that the interior chamber 1507 has multiple segments. The first segment is the cone or concave segment 1508 without a closure end. The second segment is a cylinder segment 1550 that has a diameter substantially the same as the largest diameter of the cone or concave segment. While the cone or concave segment 1508 is used to channel the ball bearing 1504 to engage the switch trigger 1506, the cylinder segment 1550 is used to house the ball bearing 1504 in case of a toppling event. The third segment is a mount segment 2102 that has a circular interior shape and a quadrilateral exterior shape. At interior corners between the circular shape and quadrilateral exterior shaped are a set of through-holes 1552. Underneath-holes 1552 and on the interior side of the safety box 1302 are a set of screw-receiving stems to receive a set of fasteners to secure the interior chamber 1507 thereto the box 1302.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The inventions defined solely by the appended claims including any amendments made during the pendency of this application and all equivalents of those claims as issued.

What is claimed is:

1. A transducer, comprising:
   a housing quadrilateral in shape with a bottom opening;
   an interior chamber in a hollow inverted conical shape with a tip end removed yielding a smallest diameter on a lower end and a largest diameter on an upper end where a first concentric axis is located along a number of midpoints of the smallest diameter and the largest diameter;
   a vertical wall situated below the hollow inverted conical shape of the interior chamber offset from the first concentric axis; and
   a multi-terminal switch with a trigger for making one of connection and disconnection being mounted on the vertical wall;
   wherein the trigger of the multi-terminal switch is located in the middle of the smallest diameter along the first concentric axis.

2. The transducer of claim 1, wherein a ball is placed inside the hollow inverted conical shape of the interior chamber.

3. The transducer of claim 1, wherein on an interior upper side of the housing comprises a set of screw receiving stems spaced equal distance apart from each other.

4. The transducer of claim 1, wherein an upper end of the inverted conical shape of the interior chamber transitions into a hollow cylindrical shape sharing the first concentric axis.

5. The transducer of claim 4, wherein an upper end of the cylindrical shape of the interior chamber transitions into a mount with an exterior quadrilateral shape and an interior circular shape sharing the first concentric axis.

6. The transducer of claim 5, wherein a set of through holes are located at each inside corner of the quadrilateral shape of the mount.

7. The transducer of claim 6, wherein the interior chamber is mounted to the housing by installing a set of screws into the set of screw receiving stems via the set of through holes.

8. The transducer of claim 1, wherein the trigger is engaged as the ball is gravity pulled onto the lowest position of the interior chamber.

9. The transducer of claim 1, wherein the switch has a first terminal, a second terminal and a third terminal.

10. The transducer of claim 9, wherein the first terminal is connected to an incoming electrical power line.

11. The transducer of claim 9, wherein the trigger engages one of the second terminal and the third terminal.

12. The transducer of claim 10, wherein one of the second terminal and the third terminal is connected to an outgoing electrical line.

13. The transducer of claim 8, wherein when the ball engages the trigger, the incoming electrical power source is connected to one of the second terminal and the third terminal.

14. The transducer of claim 1, wherein the bottom opening of the housing comprises a pair of curved engagement segments with a pair of interior accommodation zones and a pair of outer engaging portions.

15. The transducer of claim 14, wherein the pair of interior accommodation zones is removably rested on a mounting bracket with a pair of complimentary interior accommodation zones.

16. The transducer of claim 15, wherein a bolt is transversely inserted into a pair of holes on the outer engaging portions and a pair of engaging holes of the mounting bracket.

17. The transducer of claim 16, wherein a nut is tightened onto the bolt to frictionally secure the electrical safety device onto the mounting bracket.

18. The transducer of claim 1, wherein a chamber hole is located on the interior chamber and a house hole is located on the housing wherein both the chamber hole and the house hole share a second concentric axis.

19. The transducer of claim 8, wherein a push rod having a tip end and a butted end with a circular groove therein between is inserted into the chamber hole and the house hole.

20. The transducer of claim 19, wherein a retainer clip is transversely inserted into the circular groove of the push rod in a space inside the housing and outside the interior chamber to retain the push rod therein the chamber hole and the house hole.

21. The transducer of claim 19, wherein upon pushing of the push rod into the housing and interior chamber, the tip end pushes the ball off center within the conical shape of the interior chamber to prevent the ball from rolling into the lowest position of the interior chamber to come in contact with the trigger.

22. The transducer of claim 21, wherein upon pulling of the push rod from the housing, the tip end no longer engages the ball within the conical shape of the interior chamber allowing the ball to roll into the lowest position of the interior chamber to engage the trigger.

23. The transducer of claim 1, wherein a set of house screw receiving stems being located at interior corners of the housing.

24. The transducer of claim 23, further comprises a cover in quadrilateral shape with a set of cover through holes at each interior corner of the cover.

25. The transducer of claim 24, wherein the cover comprises a number of holes respectively allowing the incoming electrical line and the outgoing electrical line to pass therethrough.

26. The transducer of claim 24, wherein a set of screws insertably secured the cover to the housing via the set of house screw receiving stems and the set of cover through holes.

* * * * *